G. Fitz,
Cotton Press.
Nº 224. Patented June 3, 1837.
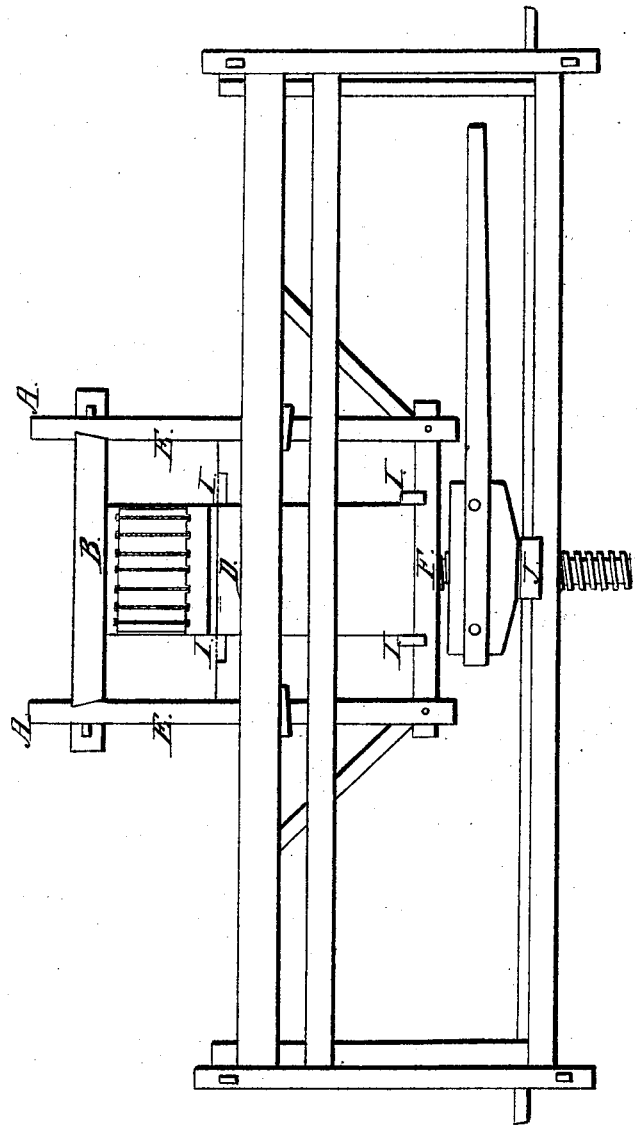

UNITED STATES PATENT OFFICE.

GIDEON FITZ, OF CLINTON, MISSISSIPPI.

IMPROVEMENT IN COTTON-PRESSES.

Specification forming part of Letters Patent No. 224, dated June 10, 1837.

*To all whom it may concern:*

Be it known that I, GIDEON FITZ, of the town of Clinton, State of Mississippi, have invented a new and improved mode of using the screw in pressing cotton, of which the following is a specification.

What I claim as my invention, and desire to secure by Letters Patent, is—

The mode of connecting the screw with the cotton-box by placing the nut of the screw under the box on a sill or sills, which sill or sills may be let into the ground in a horizontal manner and be covered over with earth a few inches deep, to admit the horse or team which carries the lever round to pass over the sill or sills.

The sill or sills may be connected with the joists or girders by a clamp at each end, which may prevent the joists or girders to which the cotton-box or its frame is attached from rising when the screw is forced upward; but if the weight on the joists or girders is sufficient to keep from them rising, then the clamps will not be needed. If the nut be turned by a movable lever, the clamps may be placed near to the screw. The lever is attached to the nut of the screw, and when the screw is let down to receive cotton in the box the lower end of the screw descends into the ground below the sill or sills on which the nut rests and turns. The screw may be made of wood or iron.

To enable others to make and use my said improved cotton-press, I give the following description of its construction and operation:

The drawing which accompanies this description represents a full side view of the press. The pressure is upward, and the bale is made on the top of the joists or girders of the press-room. It should be placed so far from the main wheel of the gin as to prevent the lever from interfering with the gin. The lever for a wood screw should be about fourteen to eighteen feet long, depending on the distance between the threads of the screw. I advise that the threads of the screw shall not rise more than five inches for each revolution, and am of opinion that three or four inches would be better, as the stress then would not be so great on the lever in making a heavy bale. The only one that has been tried has the lever about fifteen or sixteen feet long, and the threads of the screw rise five inches in each revolution. It works well with one strong horse or two mules. The screw is fifteen inches diameter, with square threads one inch deep. Two sills about a foot square may be laid side by side a few inches below the surface of the ground, leaving space for the screw to pass down between them. These sills pass under the cotton-box and extend a little beyond the house at each end. A piece—say two feet wide and six to nine inches thick—is laid across the sills under the center of the cotton-box, let into the sills, so as to keep it firm. Through the center of this is cut a hole to fit the outside of the screw, so that the screw may pass up and down through it without shifting sidewise. The nut is placed on this piece, having a washer of iron of half-inch thick nailed on the under side of the nut, the rim being about two inches wide and the diameter of the inside just so large as to admit the screw to pass through. A like washer is nailed to the piece below, which washers rub against each other when the nut is carried round. They prevent the nut and piece on which it turns from wearing each other, and take off some friction. Four nails of about three or four inches long for each washer, having heads sunk in the rim, are sufficient. On the upper end of the screw-pin is strongly mortised a piece called the "follower," of about ten inches thick and of such width and length as to fit the inside of the box, leaving only space of about an inch all round. On the top of this piece, across it, are nailed strips of thick plank—say inch and half to two inches thick—leaving space between each strip for the rope. These fit the box, except about half-inch all round. A strip of about six inches wide of like plank is nailed across the follower at each end on the under side, projecting out so as to fit the box nearly, leaving room only to prevent the follower from jostling in the box. When the screw is down, this follower forms the bottom of the cotton-box, on which the cotton is tramped. When the screw is up, the follower appears above the box about eight inches, between the press-doors, where the bale is made. At this place the small piece of baling-cloth is laid on the follower, and attached to it by four small spikes driven into the sides of the follower, having sharp points to pierce through the cloth, which points slope a little downward. They are about half-inch long out of the follower and half-way down its sides; or the cloth may be held on the follower by small hooks fastened to leather straps, the lower ends of which straps are nailed low down on the sides of the follower. When the small cloth is thus attached to the follower, the screw is let down by turning the lever backward, and when the follower is two feet or more down, carrying with it the small piece of baling-cloth, the packing in of cotton may commence. The box may be packed about two-thirds full by the time the screw gets down. This saves much time in pressing. When the box is full up to the doors, the doors are raised, and fastened at top with arrows, as usual, and then the cotton is put in over the doors until full, when the larger baling-cloth is put on, and the two sliding pieces, which form the upper part of the box, are brought directly over it. The screw being then run up makes the bale beween the doors. The two sliding pieces are made of thick plank—say two inches or more thick—with two ledges on each across on the upper side, which ledges are so far apart as to fit between the two upper side pieces of frame. One edge of each ledge is rabbeted to fit on a lath which is nailed on the inside of each of the two side pieces of the frame. On the under side of these sliders strips of thick plank are nailed, leaving space between each strip for the rope, to correspond with those on the face of the follower. When the bale is taken out, these sliders are slid—one to the right and the other to the left—to the posts, leaving the space over the box open. They meet over the center of the box. The nut is of solid wood, about six feet long, to secure it from splitting, and about twenty-six to thirty inches square, to give it strength, and sufficient hold on the threads of the screw. The lever is fastened to one side of the nut by two iron screw-bolts, which go through the lever and the nut. The press-doors will rise with the pressure, and be hard to loosen if they are not sloped a little inward at top, or a wedge may be inserted between the doors and the frame. There is space of about an inch left between the upper side of the doors and the sliders, to put in the cloth. One of the narrow sides of the box should be put on with a view to its being taken off, if necessary, to get the screw in or out, after the box is up. The upper and lower cross-pieces to which the side plank is nailed can be easily raised and taken out. A box should be put round the screw below the ground, to prevent the earth from interfering. The cotton-box is kept firm and erect by eight braces, extending from the lower part of the frame to the girders and joists. If the two upper girders are not sufficiently strong, then two others may be placed under them, and let into the side braces a little, to give strength. These braces serve to throw the pressure off from the center of the girders.

Signed in duplicate.

GIDEON FITZ.

Witnesses:
SENECA PRATT,
J. I. ROSS,
D. COMFORT.